United States Patent [19]

Shimizu

[11] Patent Number: 5,160,681
[45] Date of Patent: Nov. 3, 1992

[54] METHOD FOR THE PREPARATION OF HETEROGENEOUS SILICONE RUBBER MOLDINGS

[75] Inventor: Koji Shimizu, Chiba, Japan

[73] Assignee: Dow Corning Toray Silicone Co., Ltd, Tokyo, Japan

[21] Appl. No.: 784,453

[22] Filed: Oct. 24, 1991

[30] Foreign Application Priority Data

Oct. 26, 1990 [JP] Japan .................. 2-287339

[51] Int. Cl.$^5$ ................................. C08K 3/34
[52] U.S. Cl. ..................... 264/128; 264/236; 264/331.11; 428/405; 428/407; 528/15; 528/24
[58] Field of Search .................. 264/6, 13, 115, 130, 264/140, 143, 236, 331.12, 331.11, 128, 105; 428/405, 407, 143, 144, 145, 206, 220, 331, 327, 447; 528/15, 24

[56] References Cited

U.S. PATENT DOCUMENTS

| | | | |
|---|---|---|---|
| 4,505,848 | 3/1985 | Kobayashi | 252/511 |
| 4,528,156 | 7/1985 | Fukuda et al. | 264/236 |
| 4,728,687 | 3/1988 | Watanabe et al. | 524/493 |
| 4,783,289 | 11/1988 | Shimizu et al. | 264/28 |
| 4,824,616 | 4/1989 | Shimizu et al. | 264/7 |

*Primary Examiner*—Mary Lynn Theisen
*Attorney, Agent, or Firm*—Edward C. Elliott

[57] ABSTRACT

A method is disclosed for preparing a heterogeneous silicone rubber molding wherein a portion of the molding is formed from a semicured silicone rubber particulate and a portion from a thermosetting silicone rubber composition. The mold is filled with the particulate and the thermosetting silicone rubber composition, then closed and pressurized and heated, forming the portions into a single body or element by curing the thermosetting silicone rubber composition at the same time that curing of the semicured silicone rubber particulate is brought to completion.

5 Claims, No Drawings

METHOD FOR THE PREPARATION OF HETEROGENEOUS SILICONE RUBBER MOLDINGS

BACKGROUND OF THE INVENTION

1. Field of the Invention

The present invention relates to a method for the preparation of heterogeneous silicone rubber moldings. More specifically, the present invention relates to an efficient method for the preparation of silicone rubber moldings in which different types of silicone rubbers have been molded into a single body or mass.

2. Background Information

The contact element of, for example, the keyboard for electronic equipment such as a desk calculator or computer, typically has a structure in which different types of silicone rubbers, e.g., an insulating rubber and an electrically conductive rubber, are molded into a single body or element.

The following are exemplary of the methods which have been used heretofore for the preparation of such heterogeneous silicone rubbers moldings:

(1) the two types of silicone rubbers (insulating and conductive) are first molded separately, and the resulting separate insulating rubber component and conductive rubber component are then joined into a single body through the use of an adhesive; or (2) the unvulcanized conductive silicone rubber composition is introduced into the mold, the already vulcanized insulating rubber component molding is subsequently inserted, and press molding is then carried out.

However, these methods are encumbered by various problems in the case of heterogeneous silicone rubber moldings in which one of the molded rubber elements is very small or has a complicated shape and/or placement, for example, as in the aforementioned electronic devices. Thus, in the case of the former method, the gluing operation is very tedious and time-consuming when a very small conductive rubber element must be precisely placed in a complex configuration. As a result, in such situations this method suffers from a poor productivity and a reduced dimensional accuracy. Moreover, since the adhesive strength between the different types of silicone rubber components is extremely variable, this method also suffers from a high product defect rate. The latter method is characterized by relatively good dimensional accuracy, but the bonding strength between the silicone rubber components of different types is not entirely satisfactory. Accordingly, the preparation of heterogeneous silicone rubber moldings can be extremely difficult depending on the size, shape, or placement of one of the silicone rubber elements.

A method for the manufacture of silicone rubber moldings which makes use of a semicured, silicone rubber particulate is disclosed in U.S. patent application Ser. No. 07/719,421, filed Jun. 24, 1991, and assigned to the same owner as this application.

SUMMARY OF THE INVENTION

A heterogeneous silicone rubber molding is prepared by filling a semicured silicone rubber particulate into the cavity of the mold, then introducing a thermosetting silicone rubber composition into the mold and closing the mold, subsequently heating the mold with the application of pressure to form a cured body or element wherein the semicured silicone rubber particulate and the thermosetting silicone rubber are cured at the same time.

The present invention takes as its object the introduction of a highly productive, low-defect-rate method for the preparation of heterogeneous silicone rubber moldings which will have an excellent bonding strength and high dimensional accuracy. Furthermore, this method should be capable of molding different types of silicone rubbers into a single body regardless of the size, shape, or placement of the elements involved.

DESCRIPTION OF THE INVENTION

This invention relates to a method for the preparation of heterogeneous silicone rubber moldings wherein said method is characterized by filling a semicured silicone rubber particulate into the cavity of a mold, then introducing a thermosetting silicone rubber composition and closing the mold, and subsequently heating this mold with the application of pressure in order to form a single body or element by curing the aforesaid thermosetting silicone rubber composition at the same time that curing of the aforesaid semicured silicone rubber particulate is brought to completion.

The use of a semicured silicone rubber particulate makes possible an accurate and facile filling even when the mold cavity is small and its positioning is problematic. By following this with the introduction of a thermosetting silicone rubber composition and then molding into a single body, it is possible to produce highly dimensionally accurate and strongly bonded heterogeneous silicone rubber moldings in a highly productive manner without recourse to a complex gluing operation.

Within the context of the present invention, "semicured" denotes the following three conditions:

(1) the silicone rubber composition has undergone crosslinking with partial formation of a three-dimensional network structure to give a cure condition in which it no longer exhibits fluidity under normal conditions of quiescence but does exhibit deformation or limited fluidity under the application of stress;

(2) the organopolysiloxane in the semicured material in such a semicured condition retains residual crosslinking functional groups, and a rubbery elastic silicone rubber can be obtained by the completion of the cure through their further reaction; and (3) said semicured product has a hardness of zero as measured using the spring-type hardness tester type A (JIS A hardness meter) specified in JIS K 6301, "Physical Testing Methods for Vulcanized Rubber" (similar to ASTM D 2240), and/or a hardness not exceeding 50° as measured by an Asker C hardness meter (spring-type hardness tester from Kobunshi Keiki Kabushiki Kaisha).

The present invention's method for the preparation of heterogeneous silicone rubber moldings will be explained in greater detail below.

First, the semicured silicone rubber particulate used by the present invention is advantageously obtained from a composition whose principal components are organohydrogenpolysiloxane having at least 2 silicon-bonded hydrogen atoms in each molecule (designated below as component A) and organopolysiloxane having at least 2 silicon-bonded vinyl groups in each molecule (designated below as component B) wherein the ratio of silicon-bonded hydrogen atoms in component A to silicon-bonded vinyl groups in component B (SiH/Si—CH=CH2) falls within the range of 0.20 to 0.95 and preferably falls within the range of 0.3 to 0.6.

Component A is exemplified as follows: trimethylsiloxy-terminated methylhydrogenpolysiloxanes; trimethylsiloxy-terminated dimethylsiloxanemethylhydrogensiloxane copolymers; dimethylhydrogensiloxy-terminated dimethylsiloxane-methylhydrogensiloxane copolymers; dimethylsiloxane-methylhydrogensiloxane cyclic copolymers; copolymers composed of the (CH3)2HSiO½ unit and SiO4/2 unit; and copolymers composed of the (CH3)3SiO½ unit, (CH3)2HSi½ unit, and SiO4/2 unit.

Component A should have a viscosity of from 1 to 50,000 centipoise at 25° C. in order to obtain good miscibility with component B.

Component B is exemplified as follows: dimethylvinylsiloxy-terminated methylvinylpolysiloxanes; dimethylvinylsiloxy-terminated methylvinylsiloxanedimethylsiloxane copolymers; dimethylvinylsiloxy-terminated dimethylsiloxane-methylphenylsiloxane copolymers; dimethylvinylsiloxy-terminated dimethylsiloxane-diphenylsiloxanemethylvinylsiloxane copolymers; trimethylsiloxy-terminated dimethylsiloxane-methylvinylsiloxane copolymers; trimethylsiloxy-terminated dimethylsiloxane-methylphenylsiloxanemethylvinylsiloxane copolymers; dimethylvinylsiloxy-terminated methyl(3,3,3-trifluoropropyl)polysiloxanes; dimethylvinylsiloxy-terminated dimethylsiloxane-methyl(3,3,3-trifluoropropyl)siloxane copolymers; and polysiloxanes composed of the CH2=CH(CH3)2SiO½ unit, (CH3)3SiO½ unit, and SiO4/2 unit.

The viscosity of this component B should be at least 100 centipoise at 25° C. and preferably falls within the range of 100 to 100,000 centipoise.

Components A and B should be mixed in quantities which afford values of 0.20 to 0.95 for the molar ratio of the silicon-bonded hydrogen atoms in component A to the silicon-bonded vinyl groups in component B, i.e., SiH/Si—CH=CH2. When this ratio falls below 0.20, curing will be unsatisfactory because the crosslink density will be too low. Values for this ratio in excess of 0.95 make it difficult to achieve a semicure.

Platinum-type catalysts can be used to promote the addition reaction between the silicon-bonded hydrogen atoms in the organopolysiloxane comprising component A and the vinyl groups in the polysiloxane comprising component B. These platinum-type catalysts are exemplified by platinum black or platinum supported on a carrier, chloroplatinic acid, chloroplatinic acid dissolved in alcohol or ketone, chloroplatinic acid/olefin complexes, chloroplatinic acid/alkenylsiloxane complexes, and chloroplatinic acid/diketone complexes.

The platinum-type catalyst should be added at 0.1 to 1,000 weight parts and preferably at 1 to 100 weight parts, in each case as platinum metal per 1,000,000 weight parts of the total quantity of the aforementioned components A plus B. Quantities in excess of 1,000 weight parts are uneconomical.

The semicured silicone rubber particulate under consideration may also contain organoperoxide in an inactive state. Such organoperoxides are exemplified by 2,4-dichlorobenzoyl peroxide, 1,1-bis(tert-butylperoxy)-3,3,5-trimethylcyclohexane, 1,1-bis(tert-butylperoxy)cyclohexane, ditert-butyl peroxide, tert-butyl cumyl peroxide, dicumyl peroxide, 2,5-dimethyl-2,5-di(tert-butylperoxy)hexane, and 2,5-dimethyl-2,5-di(tert-butylperoxy)hex-3-yne. This should be added within the range of 0.1 to 10 weight parts per 100 weight parts of the total quantity of the aforementioned components A and B.

The semicured silicone rubber particulate can be prepared as follows. First, the silicone rubber composition is cured at temperatures below, for example, 100° C., while in a particulate condition, and numerous methods are known for achieving this. As one example in this regard, the aforementioned silicone rubber composition is passed through a small orifice, e.g., an extrusion nozzle, and is dripped down or poured down into a curing fluid which resides below 100° C. in order to bring about curing into a spherical morphology and a semicured condition, i.e., not completely cured. This curing fluid can be any of the various thermal media as exemplified by water, liquid paraffins, waxes, dimethylsilicone oils, and phthalate esters. Among these, water is optimal due to its high heat capacity, ease of handling, and low cost. This curing fluid should generally be maintained at temperatures below 100° C. in order to avoid activating organoperoxide present in the silicone rubber composition and in order to leave functional groups in the organopolysiloxane. Maintenance at such temperatures makes possible a primary cure of the aforementioned silicone rubber composition into a semicured state. In order to accelerate the curing of this silicone rubber composition, the curing fluid should be maintained at least at 25° C. and preferably at least at 50° C., but below 100° C.

The semicured silicone rubber particulate thus obtained preferably has a JIS A hardness of zero and/or an Asker C hardness not exceeding 50°. A good moldability is secured through a JIS A hardness of zero and/or an Asker C hardness not exceeding 50°. In addition, no particular restriction is placed on its size; however, in general average particle sizes of 0.1 to 10 mm are preferred in order to circumvent adverse effects by the size, shape, positioning, etc., of the mold cavity and thus obtain facile filling and molding. Moreover, the surface of semicured silicone rubber particulates is generally tacky, which results in a strong tendency to clump. As a consequence, in order to prevent clumping and support ease of handling, the semicured silicone rubber particulate should be dusted with, for example, a microfine silicone rubber powder as obtained by curing a liquid silicone rubber composition while in an emulsified state. Silicone rubber powders are disclosed in U.S. Pat. Nos. 4,742,142, issued May, 3, 1988; 4,743,670, issued May 10, 1988; and 4,749,765, issued Jun. 7, 1988; which are incorporated by reference to show silicone rubber powders and methods for their manufacture.

With regard to the thermosetting silicone rubber composition employed by the present invention, this will differ in at least one attribute from the silicone rubber composition which gives the aforesaid semicured silicone rubber particulate, for example, with regard to the type of polysiloxane comprising the aforementioned components A and B, or with regard to the various types of additives, or with regard to their blending proportions. This thermosetting silicone rubber composition may be a liquid or a gum, but viscosities of $10^2$ to $10^7$ poise are preferred.

Other than the aforementioned organoperoxide, suitable additives are exemplified by electrical conductivity donors such as carbon black, metal powders, and conductive fiber, and by colorants and fillers. The fillers are exemplified by reinforcing fillers such as precipitated silica, fumed silica, fumed titanium oxide, and calcined silica; by nonreinforcing fillers such as quartz powder, diatomaceous earth, asbestos, aluminosilicic acid, iron oxide, zinc oxide, and calcium carbonate; and by the preceding whose surface has been treated with an organosilicon compound such as hexamethyldisilazane, trimethylchlorosilane, or polymethylsiloxane.

The semicured silicone rubber particulate and the thermosetting silicone rubber composition are then molded, for example, using a mold which is separable into upper and lower elements. In general, the lower element of such a mold will contain a cavity at some particular location which is capable of providing the desired shape and dimensions. Due to the particulate nature of the semicured silicone rubber particulate, it can be easily filled into the cavity in the lower mold element regardless of the particular shape and dimensions. After the semicured silicone rubber particulate has been filled into the cavity in the lower element, the thermosetting silicone rubber composition is placed over it and the mold is then closed by the upper element. The metal mold is then hot-pressed: this decomposes organoperoxide, if present, in the semicured silicone rubber particulate and initiates the reaction of the residual functional groups in the organopolysiloxane. This leads to a completion of the cure, while the hot-pressing also induces curing of the thermosetting silicone rubber composition at the same time. After completion of the cure, the mold is cooled and the product is demolded.

In addition, the semicured silicone rubber particulate can be filled and molded after the thermosetting silicone rubber composition has been introduced or poured into the cavity in the lower mold.

According to the method of the present invention, a semicured silicone rubber particulate is filled into a cavity in the lower element of a mold, a thermosetting silicone rubber composition is then introduced, and the mold is closed and subjected to hot-press molding. This method makes possible a highly dimensionally accurate unification molding of the part corresponding to said cavity regardless of the size, shape, and positioning of the cavity in the lower mold. Furthermore, this method provides for the very productive, simple, and straight-forward production of heterogeneous silicone rubber moldings in which the silicone rubber molded elements are strongly bonded to each other.

Accordingly, the present invention is extremely useful for the production of the heterogeneous silicone rubber moldings which are typically found in electronic instruments and devices, for example, multicolor keyboards, keyboard contacts, and zebra connectors.

The following examples are included for illustrative purposes only and should not be construed as limiting the invention which is properly set forth in the appended claims. All parts are parts by weight, cp equals centipoise, and the viscosity is the value at 25° C.

EXAMPLE 1

First, 100 parts dimethylvinylsiloxy-terminated dimethylpolysiloxane (viscosity of 500 cp, vinyl group content of 0.5 weight percent) was mixed with 40 parts conductive carbon black (surface area of 70 m2/g, Denka Black from Denki Kagaku Kabushiki Kaisha). Into this were mixed 1.5 parts trimethylsiloxy-terminated methylhydrogenpolysiloxane (silicon-bonded hydrogen content of 0.8 weight percent) and 1.0 parts of the organoperoxide 2,5-bis(tert-butylperoxy)-2,5-dimethylhexane to give a mixture I. Then, a mixture II was prepared by the addition with mixing of 0.4 parts isopropanolic chloroplatinic acid solution (platinum content of 3 weight percent) to a mixture of 100 parts of the aforementioned dimethylvinylsiloxy-terminated dimethylpolysiloxane and 40 parts conductive carbon black (surface area of 70 m2/g, Denka Black from Denki Kagaku Kabushiki Kaisha). These mixtures I and II were introduced into gear pump hoppers in a proportion of I:II=1:1. After prescribed quantities had been weighed out, mixing to homogeneity was carried out in a static mixer. This was then passed through a 2 mm diameter nozzle and extruded in strand form into hot water (70° C.). After a 10-second residence time, removal and cutting with a cutter afforded a semicured silicone rubber particulate (2.5 mm diameter×1.0 mm). This particulate had a JIS A hardness of zero and an Asker C hardness of 10°.

This semicured silicone rubber particulate was dried in an oven at 100° C. and then dusted with 0.5 percent silicone powder (Torayfil E601) in order to detackify it. This powder is a cured silicone rubber powder having spherical particles of from 1 to 10 micrometers average diameter.

Using a mold for the production of press keyboards (24 contacts×2 sheets, concavity diameter of 2.5 mm diameter), the semicured silicone rubber particulate was filled into the concavities in the bottom element. A prescribed quantity of an addition reaction-curing liquid thermosetting silicone rubber composition (SE 6706A/B from Toray Dow Corning Silicone Company, Limited) was then poured in and the mold was closed by the upper element. Curing was conducted by pressing for 10 minutes at 170° C.

After completion of the cure, the mold was opened and the keyboard was released. The contact elements on the keyboard were evaluated: the conductive part originating from the semicured silicone rubber particulate and the insulating part originating from the thermosetting silicone rubber composition were completely bonded to give a single body. Moreover, the interface between the conductive part and insulating part was smooth and flat and exhibited excellent dimensional accuracy.

Otherwise, a bonded composite sheet was press molded from the aforementioned semicured silicone rubber particulate and addition reaction-curing liquid thermosetting silicone rubber composition under the same conditions as above to afford a 50 mm×10 mm test specimen. This test specimen was subjected to a peeling test, and the bonding strength was found to be 40 kg/cm2. Moreover, after the test, it was observed that failure had occurred in the conductive region originating from the semicured silicone rubber particulate, but that the joint surface remained intact. In addition, the JIS A hardness of the conductive part was 45 and the JIS A hardness of the insulating part was 55.

EXAMPLE 2

The procedure of Example 1 was followed, but in this case using a mixture I which lacked the organoperoxide. A semicured silicone rubber particulate (2.5 mm diameter×1.0 mm) was prepared by mixing to homogeneity in a static mixer as in Example 1, extrusion from a 2 mm diameter nozzle in strand form into 90° C. water, removal after a 5-second residence time, and cutting with a cutter. This particulate had a JIS A hardness of zero and an Asker C hardness of 10°.

This semicured silicone rubber particulate was dried in an oven at 100° C. and then dusted with 0.5 percent silicone powder (Torayfil E601) in order to detackify it.

Again proceeding as in Example 1 and using a mold for the production of press keyboards (24 contacts×2 sheets), a heterogeneous silicone rubber molding (keyboard) was prepared in which the conductive part originated from the semicured silicone rubber particulate and the insulating part originated from the liquid thermosetting silicone rubber composition. The contact elements of the resulting keyboard molding were examined: it was determined that the conductive part (from the semicured silicone rubber particulate) and the insulating part (from the thermosetting silicone rubber composition) were flawlessly bonded into a single body. A large difference in hardness was observed since the JIS A hardness of the conductive part was 30 and the JIS A hardness of the insulating part was 55.

EXAMPLE 3

The procedure of Example 1 was followed, but in this case using a mixture I which lacked the organoperoxide and which contained 30 parts wet-method silica (Nipsil LP from Nippon Silica Kogyo Kabushiki Kaisha) in place of the conductive carbon black (Denka Black from Denki Kagaku Kabushiki Kaisha). A semicured silicone rubber particulate (2.5 mm diameter×1.0 mm) was prepared by mixing to homogeneity in a static mixer as in Example 1, extrusion from a 2 mm diameter nozzle in strand form into 90° C. water, removal after a 5-second residence time, and cutting with a cutter. This particulate had a JIS A hardness of zero and an Asker C hardness of 7°.

This semicured silicone rubber particulate was dried in an oven at 100° C. and then dusted with 0.5 percent silicone powder (Torayfil E601) in order to detackify it.

Again proceeding as in Example 1 and using a mold for the production of press keyboards (24 contacts×2 sheets), a heterogeneous silicone rubber molding (keyboard) was prepared in which part originated from the semicured silicone rubber particulate and the other part originated from the liquid thermosetting silicone rubber composition. The elements of the resulting keyboard molding were examined: it was determined that the part from the semicured silicone rubber particulate and the part from the thermosetting silicone rubber composition were flawlessly bonded into a single body. The JIS A hardness of the part originating from the semicured silicone rubber particulate was 20.

That which is claimed is:

1. Method for the preparation of heterogeneous silicone rubber moldings wherein said method comprising filling a semicured silicone rubber particulate into the cavity of a mold, then introducing a thermosetting silicone rubber composition and closing the mold, and subsequently heating this mold with the application of pressure in order to form a single body or element by curing the aforesaid thermosetting silicone rubber composition at the same time that curing of the aforesaid semicured silicone rubber particulate is brought to completion.

2. Method for the preparation of heterogeneous silicone rubber moldings according to claim 1 wherein the semicured silicone rubber particulate has a JIS A hardness (Shore A durometer) of zero, and a average particle size of 0.1 to 10 mm.

3. Method for the preparation of heterogeneous silicone rubber moldings according to claim 1 wherein the semicured silicone rubber particulate is prepared from a silicone rubber composition whose principal components are organohydrogenpolysiloxane having at least 2 silicon-bonded hydrogen atoms in each molecule and organopolysiloxane having at least 2 silicon-bonded vinyl groups in each molecule wherein the ratio of silicon-bonded hydrogen atoms in the former organohydrogenpolysiloxane to silicon-bonded vinyl groups in the latter organopolysiloxane (SiH/Si—CH=CH2) falls within the range of 0.20 to 0.95.

4. Method for the preparation of heterogeneous silicone rubber moldings according to claim 3 wherein the ratio of silicon-bonded hydrogen atoms in the former organohydrogenpolysiloxane to silicon-bonded vinyl groups in the latter organopolysiloxane (SiH/Si—CH=CH2) falls within the range of 0.3 to 0.6.

5. Method for the preparation of heterogeneous silicone rubber moldings according to claim 3 wherein the semicured silicone rubber particulate also contains organoperoxide.

* * * * *